United States Patent
Johansson et al.

(10) Patent No.: US 12,351,125 B2
(45) Date of Patent: Jul. 8, 2025

(54) BELT BUCKLE FOR A SAFETY BELT IN A CHILD RESTRAINT SYSTEM

(71) Applicant: Holmbergs Safety System Holding AB, Halmstad (SE)

(72) Inventors: Simon Johansson, Halmstad (SE); Rickard Bengtsson, Halmstad (SE); Yuk Ming Cheng, Kowloon (HK)

(73) Assignee: HOLMBERGS SAFETY SYSTEM HOLDING AB, Halmstad (SE)

( * ) Notice: Subject to any disclaimer, the term of this patent is extended or adjusted under 35 U.S.C. 154(b) by 74 days.

(21) Appl. No.: 17/758,498

(22) PCT Filed: Dec. 14, 2020

(86) PCT No.: PCT/SE2020/051205
§ 371 (c)(1),
(2) Date: Jul. 7, 2022

(87) PCT Pub. No.: WO2021/145808
PCT Pub. Date: Jul. 22, 2021

(65) Prior Publication Data
US 2023/0022040 A1    Jan. 26, 2023

(30) Foreign Application Priority Data
Jan. 16, 2020   (SE) .................... 2050035-1

(51) Int. Cl.
*B60R 22/48* (2006.01)
*A44B 17/00* (2006.01)
(Continued)

(52) U.S. Cl.
CPC .......... *B60R 22/48* (2013.01); *A44B 17/0017* (2013.01); *B60N 2/272* (2023.08);
(Continued)

(58) Field of Classification Search
CPC . B60R 22/48; B60R 21/01546; B60R 22/105; B60R 2022/4816; A44B 17/0017;
(Continued)

(56) References Cited

U.S. PATENT DOCUMENTS 5,406,252 A    4/1995  Dear
5,742,986 A *  4/1998  Corrion ............. B60R 21/01546
                                                    280/735
(Continued)

FOREIGN PATENT DOCUMENTS

CN       2740483 Y     11/2005

OTHER PUBLICATIONS

International Search Report and Written Opinion mailed Mar. 24, 2021, issued in corresponding International Patent Application No. PCT/SE2020/051205, filed Dec. 14, 2020, 12 pages.
(Continued)

*Primary Examiner* — David M Upchurch
(74) *Attorney, Agent, or Firm* — Christensen O'Connor Johnson Kindness PLLC (57) ABSTRACT

The invention is related to a buckle housing (1; 1') for a safety belt in a child safety seat. The buckle housing (1; 1') comprises a recess (2; 2') adapted to receive a tongue (3; 3') of the safety belt, a magnet (4; 4') 5 arranged within the housing (1; 1') to be movable between a first position (P1) and a second position (P2) thereof, and a magnet sensor (5; 5') arranged in the housing (1, 1') and adapted to detect when the magnet (4, 4') is in the second position (P2). The invention also relates to a method for indicating the presence of a tongue (3; 3') in a belt buckle housing (1; 1').

15 Claims, 6 Drawing Sheets

(51) Int. Cl.
*B60N 2/26* (2006.01)
*B60R 21/015* (2006.01)
*B60R 22/10* (2006.01)
*B60N 2/28* (2006.01)
*B60R 21/01* (2006.01)

(52) U.S. Cl.
CPC ...... *B60R 21/01546* (2014.10); *B60R 22/105* (2013.01); *B60N 2/2812* (2013.01); *B60R 2022/4816* (2013.01)

(58) Field of Classification Search
CPC ... A44B 11/2569; B60N 2/2812; B60N 2/272
See application file for complete search history.

(56) References Cited

U.S. PATENT DOCUMENTS

| | | | |
|---|---|---|---|
| 5,966,784 A * | 10/1999 | Arbogast | B60R 22/48 24/642 |
| 6,175,304 B1 | 1/2001 | Becker | |
| 6,230,088 B1 * | 5/2001 | Husby | B60R 21/01556 280/801.1 |
| 6,357,091 B1 * | 3/2002 | Devereaux | B60R 21/01546 24/303 |
| 6,381,815 B1 * | 5/2002 | Yamaguchi | B60R 22/48 24/641 |
| 6,474,435 B1 | 11/2002 | Devereaux | |
| 6,729,194 B2 * | 5/2004 | Kaijala | B60R 22/18 73/862.391 |
| 6,729,427 B1 * | 5/2004 | Do | B60R 22/48 307/10.1 |
| 6,742,229 B2 * | 6/2004 | Kanbe | B60R 22/48 24/642 |
| 6,931,696 B2 * | 8/2005 | Lee | B60R 21/01546 24/642 |
| 6,965,231 B1 * | 11/2005 | Cinoglu | A61B 5/055 324/307 |
| 9,555,769 B2 * | 1/2017 | Lanter | B60R 22/48 |
| 9,663,064 B2 * | 5/2017 | Batenkow | G01B 7/14 |
| 10,357,083 B2 * | 7/2019 | Babin | A44B 11/2561 |
| 2004/0140890 A1 | 7/2004 | Hartmann et al. | |
| 2010/0253498 A1 | 10/2010 | Rork et al. | |
| 2012/0310483 A1 | 12/2012 | Lanter | |
| 2013/0207442 A1 | 8/2013 | Sickon et al. | |
| 2018/0078001 A1 * | 3/2018 | Babin | A44B 11/2511 |
| 2020/0156589 A1 * | 5/2020 | Babin | B60N 2/265 |
| 2021/0204658 A1 * | 7/2021 | Jessup | A44B 11/2503 |

OTHER PUBLICATIONS

Notice mailed Jul. 4, 2022, issued in Swedish Application No. 2050035-1, filed Jan. 16, 2020, 6 pages.

* cited by examiner

BELT BUCKLE FOR A SAFETY BELT IN A CHILD RESTRAINT SYSTEM

TECHNICAL FIELD

The invention relates to a buckle housing for a safety belt of a child restraint system and a method for indicating the presence of a tongue in a belt buckle housing.

BACKGROUND ART

When designing belt buckles for safety harnesses or similar, one design consideration is ease of use. Belt buckles in child restraint systems should be openable in a manner which is easy for an adult but difficult for a child.

A problem with belt buckles in child restraint system is how to know that the tongue of the safety belt is in fact correctly inserted in the belt buckle such that the child is safely secured in the vehicle.

Another problem is that it can still be possible for a child to open the buckle, in case that happens it needs to be noticed by the adult.

A third problem is that children are sometimes left unintentionally abandoned in their seats.

SUMMARY OF THE INVENTION

It is an object of the present invention to provide an improvement of the seat belt buckles according to prior art.

According to a first aspect, these and other objects, and/or advantages that will be apparent from the following description of embodiments, are achieved, in full or at least in part, by a buckle housing for a safety belt in a child safety seat. The buckle housing comprises a recess adapted to receive a tongue of the safety belt, a magnet arranged within the housing to be movable between a first position and a second position thereof, and a magnet sensor arranged in the housing and adapted to detect when the magnet is in the second position. The magnet is arranged to be in the second position when the tongue is present in the recess and in the first position when the tongue is separated from the recess.

This is advantageous in that the belt buckle housing will be very resistant to dust, dirt, fluids and the like compared to belt buckle housings according to currently available prior art. This is especially due to the fact that the sensitive components of the buckle housing may be separated from the mechanical components. For instance, a separate compartment may be used for the magnet sensor and any related components thereto since no direct contact with the magnet is required.

The solution is further easy to manufacture and requires only a few components which saves time during the mounting process.

The magnet sensor may be connected to an indicator device indicating when the magnet is in the second position. This way, the problem of children sometimes being left unintentionally abandoned in their seats may be avoided to a greater extent.

The indicator device may be arranged within the child safety seat or in a vehicle carrying the child safety seat or communication device.

The buckle housing may further comprise a spring arranged in connection with the magnet to bias the magnet.

The spring may be arranged to move the magnet from the first position to the second position by means of spring force when the tongue is placed in the recess.

The spring may be arranged to be compressed by means of a release button such that the magnet is moved from the second position to the first position when the tongue is released from the recess.

The buckle housing may further comprise a separate compartment which houses the magnet sensor. The magnets sensor (and the electronics required in connection thereto) may for example be provided in a lid which in turn is attached to a cavity in the housing such that the separate compartment is created.

The spring may be arranged to be compressed by means of the tongue when placed in the recess such that the magnet is moved from the first position to the second position.

The spring may be compressed by means of the tongue via a leaf spring arranged in connection with the spring.

The spring may be arranged to move the magnet from the second position to the first position by means of spring force when the tongue is released from the recess.

According to a second aspect, the objects are achieved in full, or at least in part, by a method for indicating the presence of a tongue in a belt buckle housing. The belt buckle housing comprises a recess adapted to receive a tongue of the safety belt, a magnet arranged within the housing to be movable between a first position and a second position thereof, and a magnet sensor arranged in the housing and adapted to detect when the magnet is in either the first position or the second position. The method comprises the steps of arranging the magnet in the second position when the tongue is present in the recess, and arranging the magnet in the first position when the tongue is separated from the recess.

The method may further comprise the steps of moving the magnet from the first position to the second position by means of spring force when the tongue is placed in the recess, and compressing the spring by means of a release button such that the magnet is moved from the second position to the first position when the tongue is released from the recess.

The method may further comprise the steps of compressing the spring by means of the tongue when placed in the recess such that the magnet is moved from the first position to the second position, and moving the magnet from the second position to the first position by means of spring force when the tongue is released from the recess.

It should be noted that the different embodiments of the belt buckle housing that is described above are exemplifying only. The embodiments may be combined with each other in any suitable way depending on the requirements established for the buckle housing.

Effects and features of the second and third aspects of the present invention is largely analogous to those described above in connection with the first aspect the inventive concept. Embodiments mentioned in relation to the first aspect of the present invention are largely compatible with the second aspect of the invention.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF PREFERRED EMBODIMENTS OF THE INVENTION

FIG. 1a-1e illustrate an exemplary embodiment of a buckle housing 1 for a safety belt in a child safety seat. The buckle housing 1 comprises a recess 2 adapted to receive a tongue 3 of the safety belt, a magnet 4 arranged within the housing 1 to be movable between a first position P1 (FIG. 1c) and a second position P2 (FIG. 1d) thereof, and a magnet sensor 5 arranged in the housing 1 and adapted to detect when the magnet 4 is in the second position P2. A spring 6 is arranged to bias the magnet 4 in a groove 7, in which the magnet 4 is movable between the first position P1 and the second position P2.

The magnet sensor 5 is arranged in a separate compartment 8 (FIG. 1e) of the buckle housing 1 in a corresponding position to the second position P2 of the magnet 4 to be able to detect when the magnet 4 is in the second position P2. A partition 9 separates the compartment 8 from the recess 2 that receives the tongue 3 and magnet 4. The magnet sensor 5 is in turn connected to an indicator device (not shown) which indicates when the magnet 4 is in the second position P2. The indicator device is preferably arranged within the child safety seat.

Figure 1A:
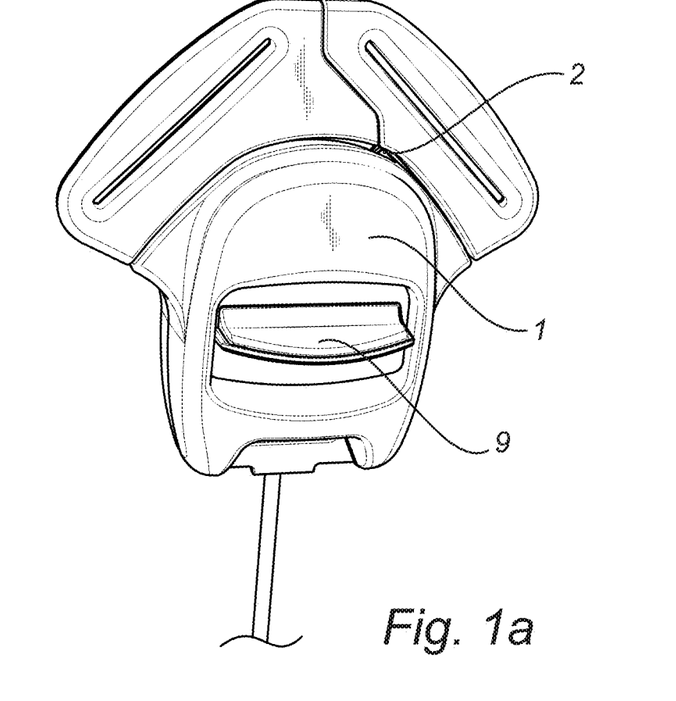
FIG. 1a-1e are perspective views of an exemplary embodiment of a belt buckle housing according to a first aspect of the invention.
Figure 1B:
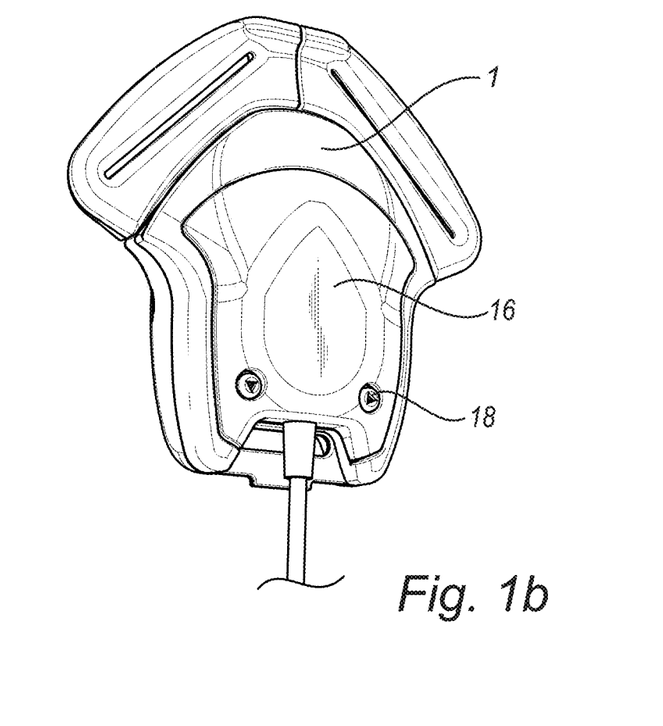
Figure 1C:
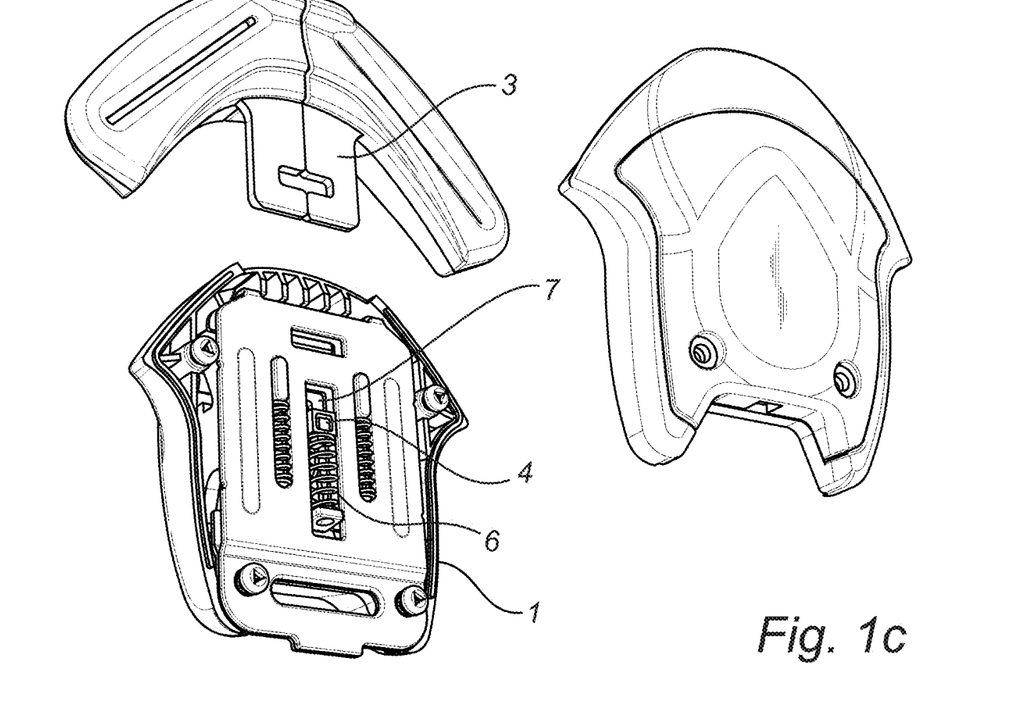
Figure 1D:
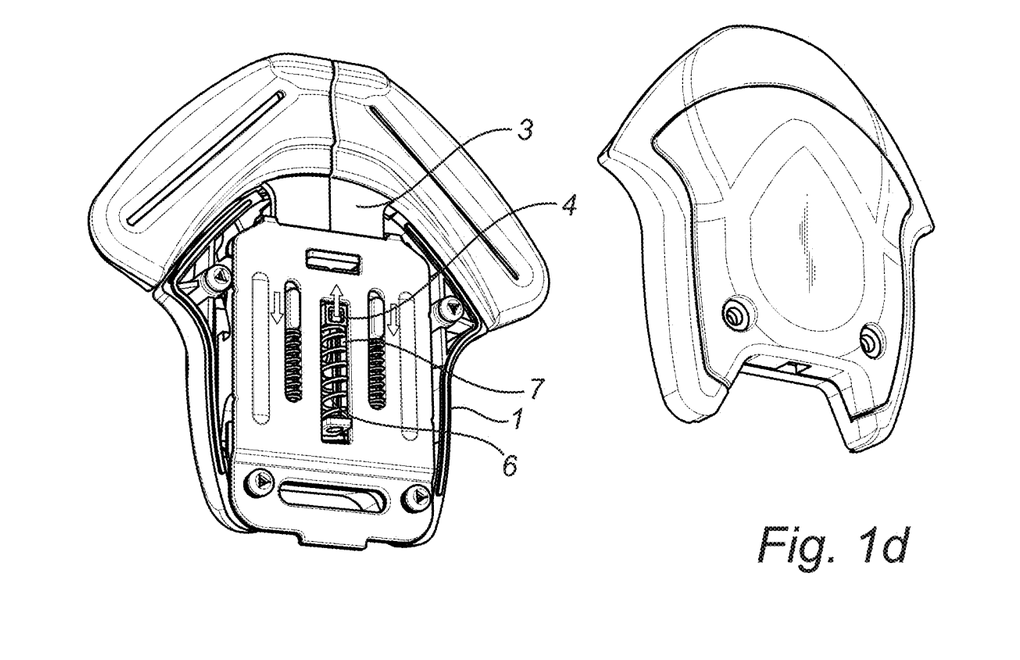
Figure 1E:
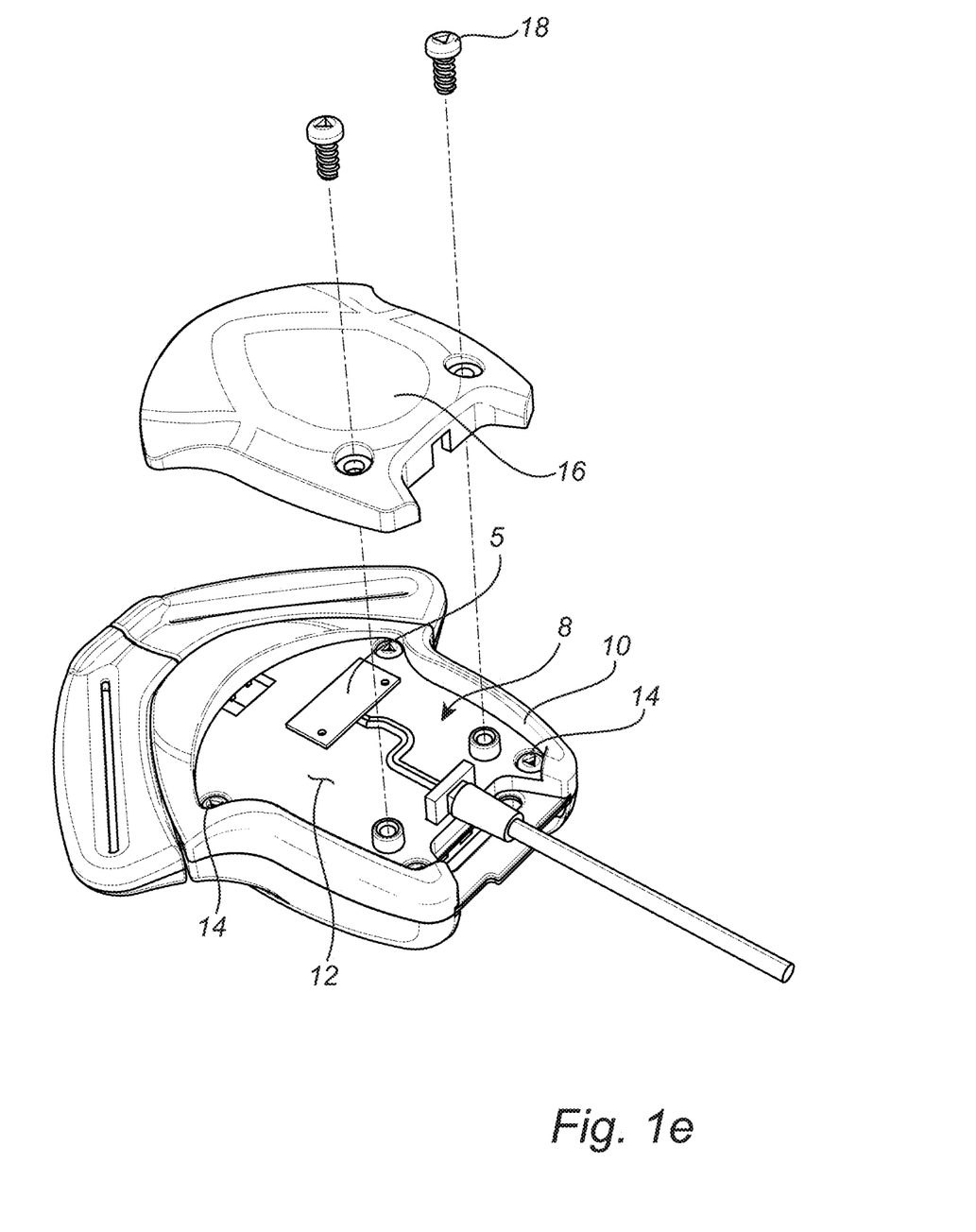

The compartment 8 where the magnetic sensor 5 is located is composed of a perimeter wall 10 that encircles the compartment. A partition 12 in the form of a plate divides and closes off the compartment from the rest of the housing, including the recess 2. The partition is mounted in the housing 1 by screws 14. An outer cover 16 is used to close off the compartment from the exterior. Screws 16 are used to secure the cover in place. In this manner, the compartment is separated from the remainder of the housing. Also, the compartment 8 is resistant to the incursion of dust, dirt, and fluids.

Also, none of the tongue 3, magnet 4, spring 6 or release mechanism button 9 are located in the compartment 8. Only the magnetic sensor 5 is located in the compartment 8.

The magnet 4 is arranged to be in the second position P2 when the tongue 3 is present in the recess 2 of the buckle housing 1 and in the first position P1 when the tongue 3 is separated from the recess 2 of the buckle housing 1 by means of a release button 9.

More specifically, when the tongue 3 is absent from the recess 2 of the buckle housing 1, a means (not shown) is arranged to maintain the spring 6 in a compressed state and thus the magnet 4 in the first position P1. Since the magnet 4 is in the first position P1, the magnet sensor 5 cannot sense the magnetic field from the magnet 4 and no signal will be sent to the indicator device. This way, the indicator device will know that the tongue 3 is not present in the buckle housing which can be communicated to the user.

When the tongue 3 is placed in the recess 2 of the buckle housing 1, the means maintaining the spring 6 in the compressed state will be removed and the magnet 4 will be moved within the groove 7 from the first position P1 to the second position P2 by means of the spring force of the spring 6. Since the magnet sensor 5 can sense the magnetic field from the magnet 4 when in the second position P2, a signal will be sent to the indicator device that the magnetic field from the magnet 4 has been detected. The indicator device will in turn know that the tongue 3 is present in the recess 2 of the buckle housing 1 which can be communicated to the user.

The spring 6 is then compressed back into a compressed state by means of the release button 9 when the tongue is to be released from the recess 2 of the buckle housing 1 such that the magnet 4, in accordance to what have been described above, will move back from the second position P2 into the first position P1.

Figure 2A:
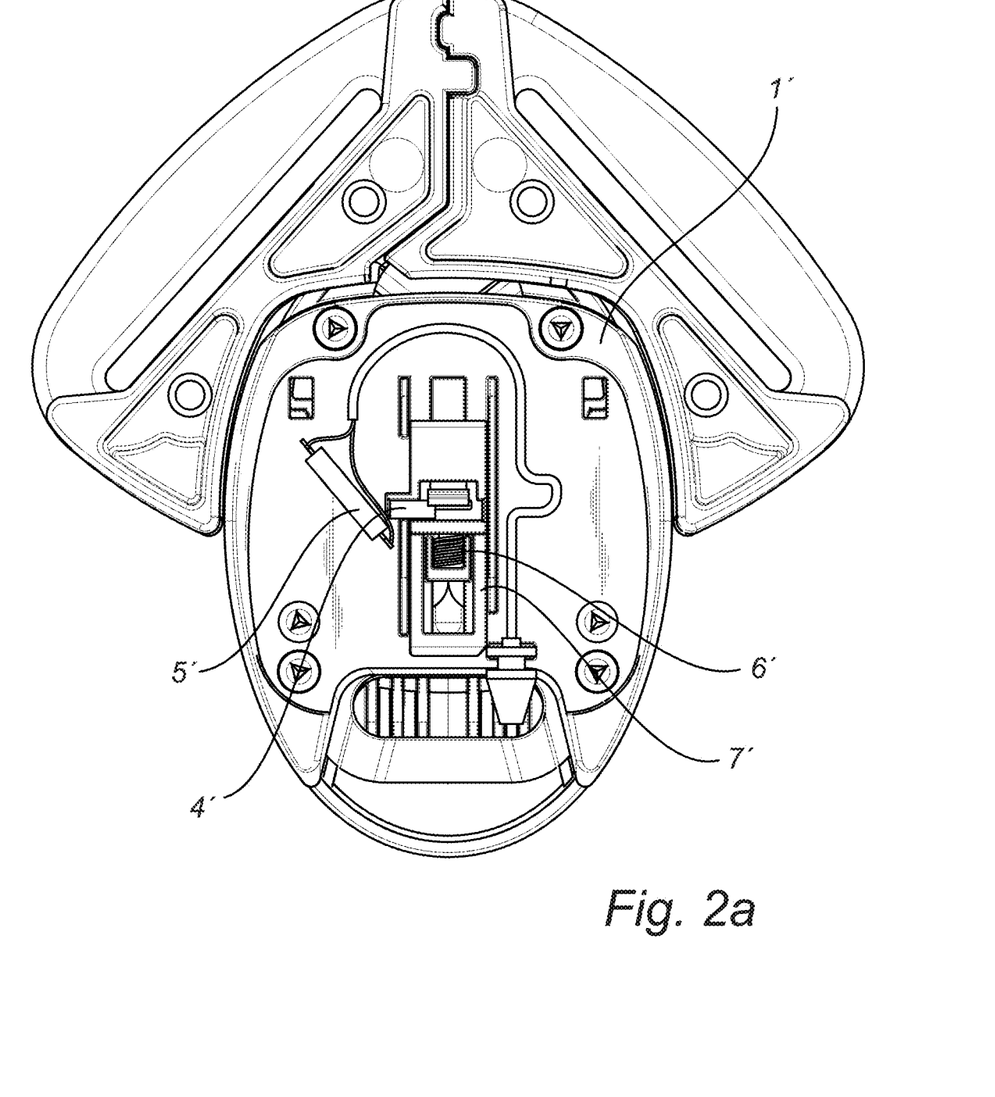
FIG. 2a-2c are perspective views of another exemplary embodiment of a belt buckle housing according to the first aspect of the invention.
Figure 2B:
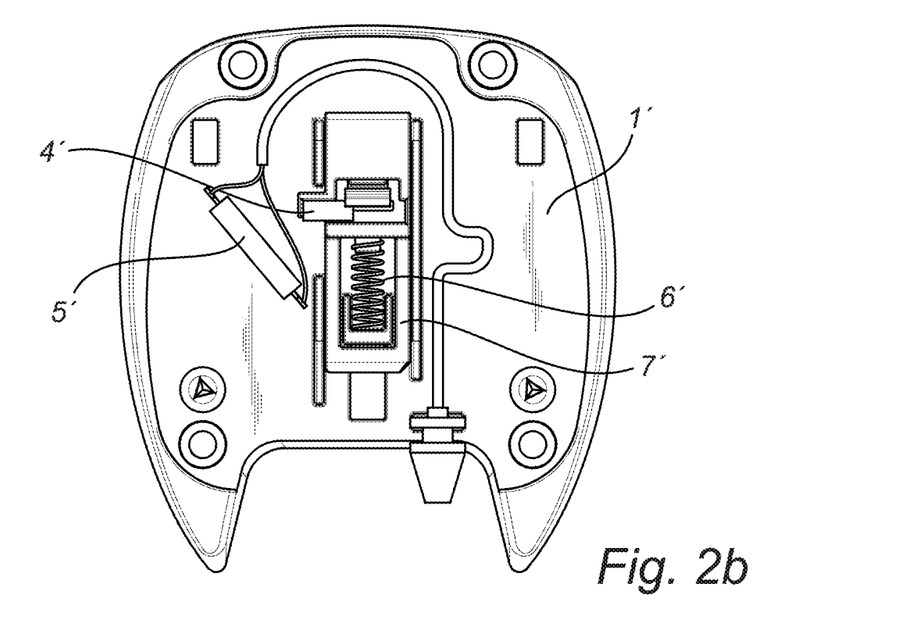
Figure 2C:
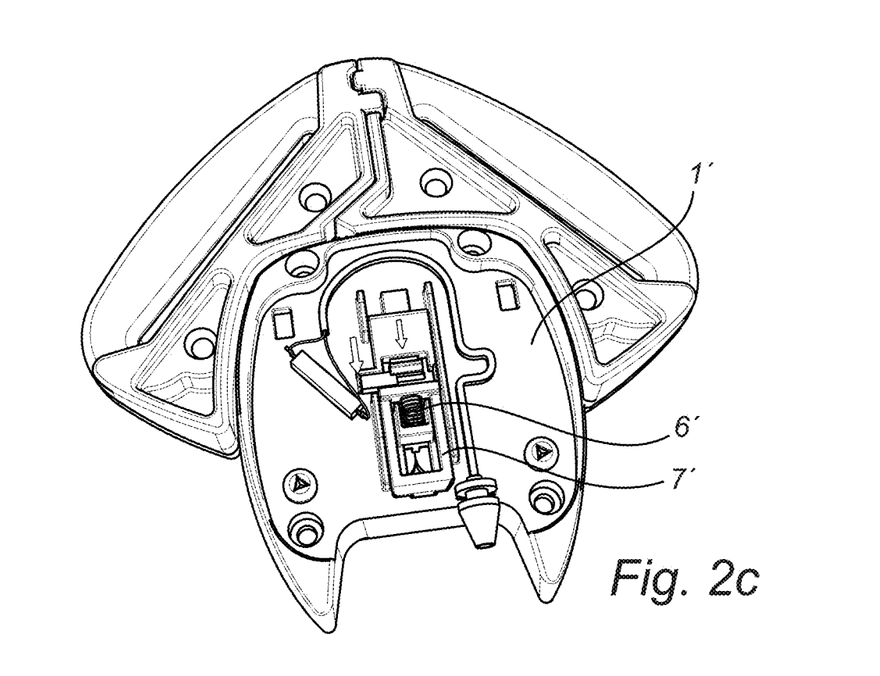

In FIG. 2a-2c, another exemplary embodiment of the buckle housing 1' is illustrated. The buckle housing 1' comprises a recess 2' adapted to receive a tongue 3' of the safety belt, a magnet 4' arranged within the housing to be movable between a first position P1 (FIG. 2b) and a second position P2 (FIG. 2c) thereof, and a magnet sensor 5' arranged in the housing 1' and adapted to detect when the magnet 4' is in the second position P2. A spring 6' is arranged in a slider 7' to bias the magnet 4' to be movable between the first position P1 and the second position P2.

The magnet sensor 5' is arranged in the vicinity of the second position P2 of the magnet 4' to be able to detect when the magnet 4' is in the second position P2. The magnet sensor 5' is in turn connected to an indicator device or communication device (not shown) which indicates when the magnet 4' is in the second position P2. The indicator device is preferably arranged within the child safety seat.

The magnet 4' is arranged to be in the second position P2 when the tongue 3' is present in the recess 2' of the buckle housing 1' and in the first position P1 when the tongue 3' is separated from the recess 2' of the buckle housing 1' by means of a release button (not shown).

More specifically, when the tongue 3' is absent from the recess 2' of the buckle housing 1', the magnet 4' is free to move with the slider 7' and thus the spring force of the spring 6' will hold the magnet 4' in the first position P1, which is the uppermost position of the slider 7'. Since the magnet 4' is in the first position P1, the magnet sensor 5' cannot sense the magnetic field from the magnet 4' and no signal will be sent to the indicator device. This way, the indicator device will know that the tongue 3' is not present in the buckle housing which can be communicated to the user.

When the tongue 3' is placed in the recess 2' of the buckle housing 1', it will compress the spring 6' via a spring leaf 10' in engagement with a portion of the slider 7' down to a compressed state, thereby moving the magnet 4' from the first position P1 to the second position P2. Since the magnet sensor 5' can sense the magnetic field from the magnet 4' when in the second position P2, a signal will be sent to the indicator device that the magnetic field from the magnet 4' has been detected. The indicator device will in turn know that the tongue 3' is present in the recess 2' of the buckle housing 1' which can be communicated to the user.

The spring force of the spring 6' will, in accordance to what have been described above, then move the magnet 4' back into the first position P1 when the tongue is released from the recess 2' of the buckle housing 1'.

The skilled person realizes that a number of modifications of the embodiments described herein are possible without departing from the scope of the invention, which is defined in the appended claims.

The invention claimed is:

1. A buckle housing for a safety belt of a child restraint system, comprising:
   the housing defining a recess adapted to receive a tongue of the safety belt,
   a magnet arranged within the recess of the buckle housing to be movable between a first position and a second position thereof, and
   wherein the magnet is arranged to be in the second position when the tongue is present in the recess and in the first position when the tongue is separated from the recess by activation of a release mechanism button,
   a magnet sensor arranged in a compartment of the buckle housing and adapted to detect when the magnet is in the second position, the compartment comprising:
      a perimeter wall formed by the housing;
      a partition to separate the compartment from the housing recess; and
      an outer cover to close the compartment from the exterior;
   wherein the compartment of the magnet sensor is arranged separate from the magnet and the release button including when the tongue is received in the recess and when the tongue is not received in the recess, and wherein the compartment of the buckle housing in which the magnetic sensor is arranged is resistant to the incursion of dust, dirt, and fluids.

2. The buckle housing according to claim 1, wherein the magnet sensor is connected to an indicator device indicating when the magnet is in the second position.

3. The buckle housing according to claim 2, wherein the indicator device is arranged within the child safety seat.

4. The buckle housing according to claim 1, further comprising a spring arranged in connection with the magnet to bias the magnet.

5. The buckle housing according to claim 4, wherein the spring is arranged to move the magnet from the first position to the second position by means of spring force when the tongue is placed in the recess.

6. The buckle housing according to claim 4, wherein the spring is arranged to be compressed by means of a release button such that the magnet is moved from the second position to the first position when the tongue is released from the recess.

7. The buckle housing according to claim 4, wherein the spring is arranged to be compressed by means of the tongue when placed in the recess such that the magnet is moved from the first position to the second position.

8. The buckle housing according to claim 7, wherein the spring is compressed by means of the tongue via a leaf spring arranged in connection with the spring via a slider.

9. The buckle housing according to claim 7, wherein the spring is arranged to move the magnet from the second position to the first position by means of spring force when the tongue is released from the recess.

10. A method for indicating the presence of a tongue in a belt buckle housing, the belt buckle housing defining a recess adapted to receive a tongue of the safety belt and a magnet arranged within the recess of the housing to be movable between a first position when the tongue is not received in the recess and a second position when the tongue is received in the recess, and a magnet sensor arranged in a compartment of the housing and adapted to detect when the magnet is in the first position or second position, the magnet sensor being disposed in the compartment of the housing separate from the magnet and a release mechanism for the tongue, the compartment comprising a perimeter wall formed by the housing, a partition to separate the compartment from the housing recess; and an outer cover to close the compartment from the exterior, whereby the compartment of the magnetic sensor is resistant to the incursion of dust, dirt, and fluids,
   wherein the method comprises the steps of:
      arranging the magnet in the second position when the tongue is present in the recess, and
      arranging the magnet in the first position when the tongue is separated from the recess.

11. The method according to claim 10, further comprising the steps of:
   moving the magnet from the first position to the second position by means of spring force when the tongue is placed in the recess, and
   compressing the spring by means of a release button such that the magnet is moved from the second position to the first position when the tongue is released from the recess.

12. The method according to claim 10, further comprising the steps of:
   compressing the spring by means of the tongue when placed in the recess such that the magnet is moved from the first position to the second position, and
   moving the magnet from the second position to the first position by means of spring force when the tongue is released from the recess.

13. The method according to claim 10, further comprising employing a partition to separate the compartment of the magnetic sensor from the tongue receiving recess.

14. The method according to claim 10, where none of the tongue, magnet, or release button are located in the compartment.

15. The buckle housing according to claim 6, where none of the tongue, magnet, or release button are located in the compartment.

* * * * *

UNITED STATES PATENT AND TRADEMARK OFFICE
CERTIFICATE OF CORRECTION

| | |
|---|---|
| PATENT NO. | : 12,351,125 B2 |
| APPLICATION NO. | : 17/758498 |
| DATED | : July 8, 2025 |
| INVENTOR(S) | : Simon Johansson et al. |

It is certified that error appears in the above-identified patent and that said Letters Patent is hereby corrected as shown below:

In the Claims

| Column | Line | |
|---|---|---|
| 6 | 50 | Claim 14, delete "release" and insert -- release mechanism -- |
| 6 | 53 | Claim 15, delete "release" and insert -- release mechanism -- |

Page 1 of 1

Signed and Sealed this
Thirtieth Day of September, 2025

John A. Squires
*Director of the United States Patent and Trademark Office*